(12) United States Patent
Reese et al.

(10) Patent No.: US 11,286,358 B2
(45) Date of Patent: Mar. 29, 2022

(54) MOLDING COMPOUND HAVING RANDOMLY ORIENTED FILAMENTS AND METHODS FOR MAKING AND USING SAME

(71) Applicant: Dow Global Technologies LLC, Midland, MI (US)

(72) Inventors: Jason A. Reese, Auburn, MI (US); Richard Baumer, Midland, MI (US); David H. Bank, Midland, MI (US); Amit K. Chaudhary, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 767 days.

(21) Appl. No.: 15/927,220

(22) Filed: Mar. 21, 2018

(65) Prior Publication Data

US 2018/0355134 A1 Dec. 13, 2018

Related U.S. Application Data

(60) Provisional application No. 62/516,641, filed on Jun. 7, 2017.

(51) Int. Cl.

| | | |
|---|---|---|
| *C08J 5/24* | (2006.01) | |
| *C08G 59/50* | (2006.01) | |
| *C08G 59/26* | (2006.01) | |
| *B29B 15/14* | (2006.01) | |
| *B29C 70/40* | (2006.01) | |

(Continued)

(52) U.S. Cl.
CPC ............... *C08J 5/24* (2013.01); *B29B 15/14* (2013.01); *B29C 70/16* (2013.01); *B29C 70/18* (2013.01); *B29C 70/22* (2013.01); *B29C 70/38* (2013.01); *B29C 70/40* (2013.01); *C08G 59/26* (2013.01); *C08G 59/5006* (2013.01); *B29K 2063/00* (2013.01); *B29K 2105/0014* (2013.01); *B29K 2105/0881* (2013.01); *C08J 2363/04* (2013.01)

(58) Field of Classification Search
CPC . C08J 5/24; B29C 70/16; B29C 70/18; B29C 70/38; B29C 70/40; B29C 70/22; C08G 59/5006; C08G 59/26; B29B 15/14
See application file for complete search history.

(56) References Cited

U.S. PATENT DOCUMENTS 8,366,046 B2   2/2013  Boursier
2016/0332339 A1* 11/2016  Boursier ............... B29B 11/16
(Continued)

FOREIGN PATENT DOCUMENTS

EP    1134314 A   9/2001

OTHER PUBLICATIONS

HexMC®-I Moulding Concept Carbon Epoxy HexMC®-i/C/2000/M77 Provisional Datasheet (Hexcel Corporation Aug. 2015).
(Continued)

*Primary Examiner* — Michael M. Robinson (57) ABSTRACT

A molding compound is made by heat-softening, fusing and compressing strips of unidirectionally aligned filaments embedded in a thermosetting resin. The thermosetting resin is non-tacky at room temperature, which allows for easy handling, elimination of cold storage and the use of robotic manufacturing methods. Composites made by molding the molding compound have excellent, highly isotropic tensile properties.

8 Claims, 1 Drawing Sheet

(51) Int. Cl.
  *B29C 70/22*   (2006.01)
  *B29C 70/16*   (2006.01)
  *B29C 70/18*   (2006.01)
  *B29C 70/38*   (2006.01)
  *B29K 105/00*  (2006.01)
  *B29K 63/00*   (2006.01)
  *B29K 105/08*  (2006.01)

(56) References Cited

U.S. PATENT DOCUMENTS

2017/0114198 A1* 4/2017 Tudor .................... B29C 70/34
2020/0032047 A1* 1/2020 Ota .......................... C08L 63/00

OTHER PUBLICATIONS

HexMC® Moulding Concept Carbon Epoxy HexMC®-i/C/2000/M81 Provisional Datasheet (Hexcel Corporation Aug. 2015).
AMTAS Project: Certification of Discontinuous Composite Material Forms for Aircraft Structures, First year planning, Apr. 23, 2009, available at depts.washington.edu/amtas/events/amtas_09spring.

* cited by examiner

MOLDING COMPOUND HAVING RANDOMLY ORIENTED FILAMENTS AND METHODS FOR MAKING AND USING SAME

This invention relates to molding compounds, methods of making the molding compounds and methods for using the molding compounds to make fiber-reinforced composites.

Fiber-reinforced composites are candidates to displace metals in the manufacture of structural components in automotive, aerospace, construction and other applications. These composites offer a significant weight advantage as they have much lower bulk densities than metals.

However, metals have other advantages which have proven difficult to duplicate with fiber-reinforced composites. Metals are easily processed and formed into complex shapes. A particular processing advantage of metals is their ability to flow under heat and pressure to entirely fill even a large, complex mold. This allows the metal to be formed into arbitrarily-shaped ingots that can be fed into the molding process. The material properties of the molded metal are highly isotropic and are highly uniform throughout the molded part. Metals tend to have high tensile strengths and tensile moduli.

Isotropic and uniform properties are more difficult to achieve with fiber-reinforced composites because these depend greatly on the alignment and distribution of the fibers. Tensile properties are greatest in the directions in which the fibers are aligned. Therefore, isotropic properties are attainable only if the fibers are oriented in multiple directions, and ideally are randomly oriented. Uniformity is achieved when the fibers are distributed evenly so the fiber content is the same or nearly the same in all regions of the composite.

Heretofore, complex manufacturing methods have been needed to obtain the necessary orientation and distribution of the fibers. In general, these methods have included the manufacture of prepregs, which are molded and cured to form the final part. The prepregs consist of reinforcing fibers and an uncured resin phase. The reinforcing fibers take the form of woven mats and/or multiple layers of aligned continuous fibers. Isotropic properties can be measured in the molded product. However, the resin and fibers cannot flow to fill out the mold during the molding step because the fibers are unable to be carried along with the resin. Therefore, the prepreg must be cut almost precisely to the dimensions of the mold. These specially-made prepregs also must be stored and inventoried. The extra steps add significantly to the production costs.

Other methods for producing composites having randomly oriented fibers include long fiber injection (LFI) and reinforced reaction injection molding (RRIM) processes. These processes are generally not well-suited for producing composites with very high fiber contents. In each of these, low viscosity liquid resin precursors are introduced into a mold together with relatively short fibers. The precursors are cured to form the composite. The process therefore requires specialized equipment for storing, metering and dispensing the precursors. Because of these shortcomings, these processes are mostly limited to making thin moldings that are not suited for structural applications.

In EP 1134314 A is described a process for making a molding compound that can be used to manufacture composites. Multifilament tows are unidirectionally aligned and impregnated with a resin. As described in EP 1134313 A, the resin should be tacky at room temperature. The impregnated fibers are cut into strips that have lengths of up to 100 mm and widths of 5 to 50 mm. The strips are then randomly deposited and compacted together to make a mat. The mat is then used as a sheet or bulk molding compound.

This process has significant drawbacks in that the molding compound usually is a thermosetting resin that is tacky at room temperature. The product must be kept cold to completely solidify the resin and reduce tackiness. Molding compounds made in accordance with EP 1134314 A have been sold by Hexcel Corporation under the tradename HexMCO. Product literature issued by the manufacturer of this material states that it is to be stored at −18° C. See HexMC®-I Moulding Concept Carbon Epoxy HexMC®-i/C/2000/M77 Provisional Datasheet (Hexcel Corporation August 2015) and HexMC® Moulding Concept Carbon Epoxy HexMC®-i/C/2000/M81 Provisional Datasheet (Hexcel Corporation August 2015). It therefore must be stored in a freezer. It must be removed and heated to room temperature before it can be used. The tackiness of the material described in EP 1134314 A disqualifies it from being used in mass production processes that employ robotic handling. As described in U.S. Pat. No. 8,366,046, the Hexcel MC® material is suitable mainly for "low flow" molding processes, in which it is made to fit very closely to the edge of the mold so minimal disturbance of the strips is seen as the part is molded. The product literature cited above recommends that about 80% of the mold area be covered with the product. Data published by the manufacturer indicates very large losses in strength when this material is molded under high flow conditions rather than low flow conditions. See "AMTAS Project: Certification of Discontinuous Composite Material Forms for Aircraft Structures, First year planning", Apr. 23, 2009, available at depts.washington.edu/amtas/events/amtas_09spring. When maximum physical properties are needed, the molding compound must be fabricated into a size and shape that closely matches that of the mold to maintain low flow molding conditions. This adds manufacturing steps to cut and assemble the molding compound into the necessary geometry.

The invention is in one aspect a method for manufacturing a molding compound, comprising the steps of:

A) forming a bed of unidirectionally aligned multifilament tows, the bed having a weight of 80 to 400 grams per square meter;

B) impregnating the bed with the curable resin composition by applying the curable resin composition to at least one major surface of the bed, heating the curable resin composition to a temperature of at least 40° C. and applying pressure to the bed and the heated curable resin composition to form an impregnated multifilament bed having a filament content of 20 to 80% by weight and cooling the impregnated multifilament bed to below 40° C., wherein the curable resin composition:

i) contains at least one epoxy resin, at least one curing agent for the epoxy resin, at least one catalyst for the reaction of the epoxy resin with the curing agent, and an internal mold release agent;

ii) has a glass transition temperature of 0 to 40° C. as measured by differential scanning calorimetry;

iii) is heat-softenable;

iv) has a curing temperature of at least 100° C. and v) cures to form a thermoset polymer;

C) cutting the impregnated multifilament bed into strips of unidirectionally aligned filaments embedded in a curable resin composition, said strips having (i) a longest dimension parallel to a direction of alignment of the filaments, said longest dimension being 25 to 100 mm, (ii) a length to width ratio of 16 to 150 and (iii) a length to thickness ratio of 50 to 1000;

D) depositing said strips to form a mat having an areal weight of 700 to 5000 grams per square meter, wherein said strips are randomly oriented within the plane of the mat; and E) heating the mat to an elevated temperature of at least 40° C. and compressing the mat to fuse said strips together to form a molding compound having 20 to 80% by weight of filaments that are randomly oriented in-plane and correspondingly 80 to 20% by weight of the curable resin composition, and cooling the molding compound to below 40° C., wherein the curable resin composition remains heat-softenable after step E) is performed.

In another aspect, the invention is a molding compound produced by the foregoing process.

The invention is also a molding compound comprising a mat of fused strips of unidirectionally aligned filaments embedded in a curable resin composition, wherein said strips before fusing have a longest dimension parallel to a direction of alignment of the multifilaments, said longest dimension being 25 to 100 mm, a length to width ratio of 16 to 150 and a length to thickness ratio of 50 to 1000 and wherein said strips contain 20 to 80% by weight of said filaments and correspondingly 80 to 20% by weight of the curable resin composition, wherein the molding compound has a bulk density of 0.002 to 0.05 g/cm$^3$, the strips are oriented randomly in-plane and the mat has an areal density of 700 to 5000 grams per square meter, and further wherein the curable resin composition.

i) contains at least one epoxy resin, at least one curing agent for the epoxy resin, at least one catalyst for the reaction of the epoxy resin with the curing agent, and an internal mold release agent;

ii) has a glass transition temperature of 0 to 40° C. as measured by differential scanning calorimetry;

iii) is heat-softenable;

iv) has a curing temperature of at least 100° C. and v) cures to form a thermoset polymer.

The invention is in yet another aspect a method of making a molded random fiber composite, comprising molding the foregoing molding compound at an elevated temperature sufficient to cure the curable resin composition to form a thermoset polymer. In such a process, the molding may be performed by exposing the molding compound to superatmospheric pressure at a temperature sufficient to surcure the curable resin composition for a time of up to 10 minutes to cure the resin composition to form a cured resin having a glass transition temperature of at least 140° C. and produce a molded composite having randomly oriented filaments distributed within a matrix of the cured resin.

The invention provides several important advantages. The molding compound is non-tacky at room temperature and slightly elevated temperatures that are commonly encountered under handling, storage and transportation conditions. By "non-tacky" it is meant that the molding compound exhibits a peak normal force of no greater than 2 grams, preferably no greater than 1 gram, as measured on a cured film by lowering a 1 cm diameter spherical probe to the surface of the film and applying a 100 g normal force for 5 seconds, and then removing the probe from the surface of the film at a rate of 1 mm/s until the probe releases from the film while measuring the peak normal force, as described in WO 2015/023615. It is also storage stable at room temperature and slightly elevated temperatures so little or no premature advancement is seen even if the molding compound is not formed into a composite for weeks or even months after the molding compound is manufactured. Because of these advantages, the molding compound does not need to be refrigerated during storage and transportation.

Another important advantage is the molding compound is easily handled robotically during composite manufacturing operations, due in part to its non-tacky surface and stiff, board-like properties, which allows automated equipment to manipulate the molding compound without fouling.

The molding compound also produces composites that have high strength and highly isotropic properties. Tensile strength and moduli can approach those of aluminum in some cases. Unlike many other composites, composites made by compression molding the molding compound of the invention are useful as vehicular structural members, due to their high strength-to-weight ratio.

In step a) of the process, a bed of unidirectionally aligned multifilament tows is prepared. The tows (sometimes referred to as "rovings") are bundles of aligned filaments. Each tow may have, for example, at least 3000, at least 6000, at least 12,000 filaments and may have up to 50,000, or up to 30,000 filaments. Tows having 12,000 to 30,000, especially 18,000 to 30,000 filaments are suitable. Tows may have weights of, for example, at least 200, at least 800 or at least 1200 g/1000 meters of length up to 3200 or up to 2400 g/1000 meters of length. The filaments preferably are not braided, twisted or otherwise entangled, and are not adhered or otherwise bonded together in such a manner that prevents the filaments in the tows from being separated to allow the curable resin composition to penetrate between them.

These filaments may be made of, for example, carbon, glass, polyamide, basalt or other suitable material. A mixture of any two or more of such materials can be used. They preferably are carbon filaments due to considerations of weight and strength. The carbon content of the filaments may be 80% or more by weight. The filaments may be composed of other materials if desired. Examples of such carbon tows are Aksaca 3K A-38, 6K A-38, 12K A-42, 24K A-42, 12K A-49 and 24 K A-49 carbon fibers from DowAksa Ileri Kompozit Malzemeler Sanayi Ltd, Sti, Itanbul, Turkey. These product designations indicate the approximate number of filaments/tow in thousands (3K being 3000 filaments, for example) and the approximate tensile strength of the fiber in hundreds of MPa (A-38 indicating a tensile strength of 3800 MPa). Other suitable carbon fibers include 12K and 24K rovings available from Dost Kimya End Hamm Sen Ve Tic Ltd. Sti, Istanbul, Turkey.

A bed is formed by aligning multiple tows in a plane. The bed may have a width, for example, of 50 cm to 2 meters or more. The areal weight (i.e., the weight of the bed per unit area of the major surface of the bed) is 80 to 400 g/m$^2$ and may be, for example, 125 to 350 g/m$^2$ or 125 to 330 g/m$^2$. The bed may be, for example, at least 0.01 mm, at least 0.0125 mm, or at least 0.015 mm thick, and up to 0.05 mm, up to 0.045 mm, up to 0.04 mm or up to 0.035 mm thick.

The tows may be spread to separate the filaments, achieve the desired areal density and to provide void space to allow for the infusion of the curable resin composition. Spreading the tows also flattens them to the desired thickness of the bed as described above. The void volume of the bed may be, for example, 25 to 75% or 35 to 65%. Spreading is conveniently formed by mechanically flattening the tows to separate the filaments.

A curable resin composition is applied to at least one major surface of the bed. The "major" surfaces are the opposing surfaces of the bed having the largest areas, and typically corresponds to the top and bottom surfaces of the bed. The curable resin composition may be applied to both major surfaces of the bed to facilitate impregnation and obtain a more uniform distribution of the resin composition into the bed.

The heat-softenable curable resin composition, at the time it is applied to the bed, exhibits a glass transition temperature ($T_g$) of at least 0° C. at least 10° C. or at least 15° C. and up to 40° C., up to 35° C. or up to 30° C., as measured by differential scanning calorimetry.

The curable resin composition preferably is in the form of a non-tacky material when applied to the bed. Therefore, the temperature of application preferably is low enough that the curable resin composition is not heat-softened enough to become tacky (as indicated by a peak normal force of at greater than 2 grams on the tack and friction test described before). A suitable temperature for applying the curable resin composition is at least 10° C., at least 15° C. or at least 18° C., up to 40° C., up to 35° C. or up to 30° C.

A convenient way of applying the curable resin composition is to form the composition into a film and then bring the film into contact with the bed of aligned tows. The film may be deposited onto a release film if desired to facilitate handling, and is conveniently formed into rolls. The films are then applied to either or both major surfaces of the bed. However, other methods can be used. For example, the curable resin composition can be formed into a particulate that is applied to the bed.

The weight of the curable resin composition is 20 to 80% of the combined weight of the composition and the bed. Its weight may be 30 to 60%, 35 to 50% or 35 to 45% on the same basis.

The bed is impregnated with the curable resin composition by heating the curable resin composition to at least 40° C. and then applying pressure to force the curable resin composition into the bed and between the filaments. The curable resin composition may be heated to a temperature of, for example, at least 50° C., and may be up to 120° C., up to 100° C., up to 80° C., up to 70° C. or up to 60° C. The amount of time during which the curable resin composition is exposed to such temperatures should be controlled to prevent the curable resin composition from curing to a state at which it is not longer capable of being heat-softened.

For purposes of this invention, the "curing temperature" is the lowest temperature at which the curable resin composition cures in 20 minutes to form a thermoset polymer having a glass transition temperature of at least 100° C.

Glass transition temperatures of cured epoxy resins, cured epoxy resin compositions and cured composites of the invention are conveniently measured using dynamic mechanical analysis, the glass transition temperature being the temperature at which the storage modulus (G') is equal to the loss modulus (G").

By "heat-softens", it is meant that the epoxy resin or mixture of epoxy resins in the curable resin composition exhibits a large decrease in viscosity (at least 50%, preferably at least 80%) when heated to an elevated temperature, to form a flowable material. The elevated temperature preferably is at least 40° C. or at least 50° C., and may be, for example, up to 80° C., up to 70° C. or up to 60° C.

Certain components of the curable resin composition may be solid materials that do not heat-soften at the temperature of the impregnation step. Examples of such components are certain curing agents and catalysts that may melt or dissolve only at higher temperatures than are seen in the impregnation step. Such solid components preferably are finely divided so they can be carried into the bed when it is impregnated.

The heat-softened curable resin composition is forced into the bed and between the individual filaments to produce an impregnated multifilament bed. This is conveniently done mechanically, such as by passing the bed and heat-softened curable resin composition between on or more sets of nip rollers or between two platens. The filament content (i.e., the weight of the filaments divided by the combined weight of filaments and curable resin composition) of the impregnated multifilament bed is 20 to 80%, and may be 40 to 70%, 50 to 70% or 55 to 65%.

After the impregnation step, the impregnated multifilament bed is cooled to below 40° C. The curable resin composition typically hardens to a tack-free state when this cooling step is performed. A suitable cooling temperature is preferably to 35° C. or below. It is generally not necessary to cool the impregnated multifilament bed to a temperature lower than about 20° C., but it can be if desired. An advantage of this invention is that the impregnated multifilament bed is typically tack-free at temperatures close to room temperature (such as 20 to 35° C.) so the product does not need to be stored or handled at low temperatures.

The curable resin composition remains heat-softenable and curable after the impregnation step and cooling steps are completed.

The intermediate product (impregnated multifilament bed) formed in the impregnation step contains 20 to 80% by weight of unidirectionally aligned filaments embedded in the curable resin composition, and correspondingly 80 to 20% by weight of the curable resin composition. It may contain 40 to 70%, 50 to 70% or 55 to 65% of the filaments and correspondingly 30 to 60%, 50 to 30% or 45 to 35% of the curable resin composition.

Figure 1:
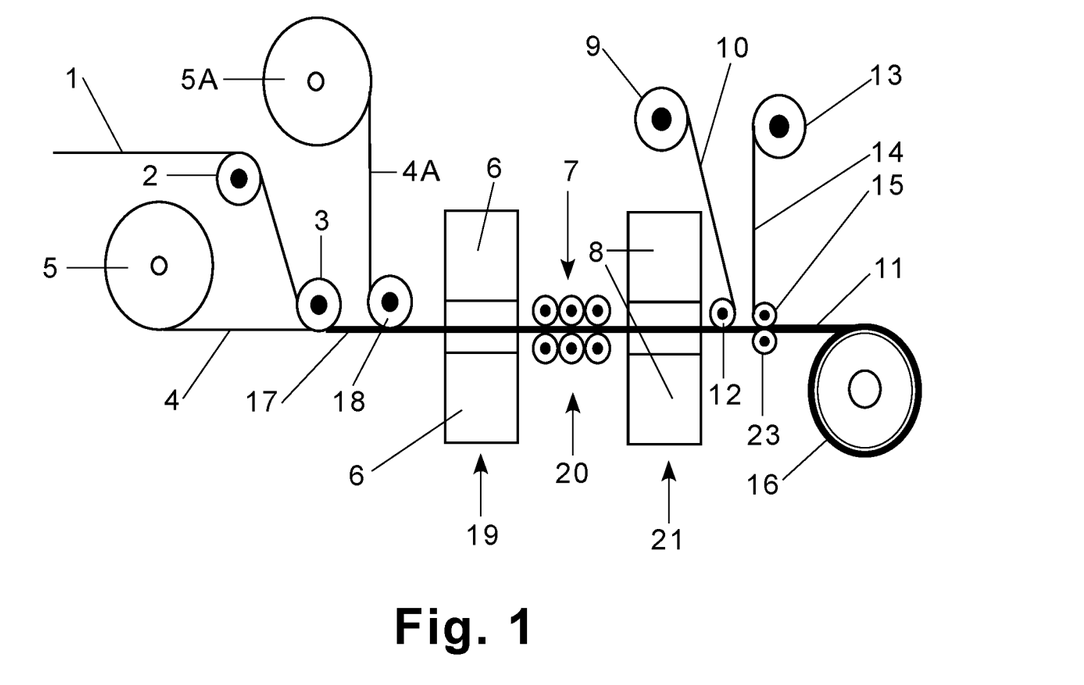
FIG. 1 is a schematic view of a first embodiment of the process of the invention.

The intermediate product may contain at least 1500, at least 4500 or at least 9000 filaments per square millimeter of cross-sectional area (taken in a plane perpendicular to the longitudinal extension of the filaments). The resin composition remains heat-softenable at a temperature and remains curable. The areal weight of this intermediate product may be, for example 140 to 1000 g/m², 200 to 875 g/m² or 225 to 750 g/m². Its thickness may be least 0.01, at least 0.125 or at least 0.15 mm, up to 0.5 mm, up to 0.45 mm, up to 0.30 mm or up to 0.35 mm A continuous process for making this intermediate product, i.e., for forming and impregnating the multifilament bed, is schematically shown in FIG. 1. A series of multifilament tows 1 are aligned horizontally and fed into the process by passing them over roller 2 or similar apparatus, where they are mechanically spread in a horizontal direction to spread the tows and separate the filaments. The spread tows are arranged to form bed 17 having an areal density and thickness as described before, which is then passed under roller 3.

In the embodiment shown, two films (4 and 4A) of curable curing composition are fed into the process from rolls 5 and 5A respectively. The width of films 4 and 4A is approximately equal to the width of bed 17. Films 4 and 4A may be coated on one side with a release backing such as a coated paper or polyethylene scrim. As shown, film 4 is applied to the underside of bed 17 at marriage roller 3 and film 4A is applied to the upper side of bed 17 at marriage roller 18. The temperatures of the films 4 and 4A are below the respective softening temperatures of the curable resin compositions at the point where they are applied to bed 17. The release backings, if present, form the topmost and bottommost layers of the assembly at this point in the process.

In the embodiment shown, the assembly then passes through heating zone 19 where heaters 6 supply energy to the assembly and heat-soften films 4 and 4A. Heaters 6 may be, for example, radiant heaters, sources of microwave radiation, or may supply heated air or other gas which is brought into contact with the assembly.

As shown, the assembly then passes through a compression zone 20 where the heat-softened films 4 and 4A are forced into bed 17 to produce impregnated multifilament bed 11. As shown, this is done by passing the assembly through a series of opposing nip rollers 7, but other apparatus such as a pair of opposing platens can be used.

Impregnated multifilament bed 11 is cooled in cooling zone 21 via coolers 8 remove energy from the curable resin composition, reducing its temperature enough to resolidify it. Coolers 8 may supply cooled air or other gas that is contacted with one or both surfaces of impregnated multifilament bed 11.

As shown, impregnated multifilament bed 11 is then removed from cooling zone 21. One or more both layers of the release backing, if used, may be removed from impregnated multifilament bed 11. In FIG. 1, removed release backing layer 10 is removed via roller 12 and take-up roller 9. An optional sealing film 14 supplied from optional roll 13 may be applied to either or both surfaces of impregnated multifilament bed 11, by passing them through rollers 15 and 23. In the embodiment shown, sealing film 14 is applied to surface of impregnated multifilament bed 11 that is on the outside when it is rolled up. In this embodiment, release backing layer 4A is removed from the same surface, and the opposing release backing layer 4 is not removed and remains with impregnated multifilament bed 11.

In the embodiment shown in FIG. 1, impregnated multifilament bed 11 is wound onto roller 16. In this embodiment, roller 16 is driven and provides motive force to pull the assembly (including multifilament tows 1 and films 4 and 4A) through the process. Alternatively or in addition, any of rollers such as rollers 3, 7, 15, 23 may be driven. The process may be performed by depositing the assembly of films 4 and 4A and bed 17 onto a moving bed such as a conveyor belt or tenter frame.

The impregnated multifilament bed formed as described above is then cut into strips. The longest dimension of the strips is in the same direction as the longitudinal extension of the filaments, so the filaments extend unidirectionally along the length of the strips.

The length of the strips is at least 20 mm, at least 25 mm, at least 30 mm or at least 40 mm and up to 100 mm, up to 80 mm or up to 60 mm.

The ratio of length to width of the strips is at least 16, preferably at least 20 or at least 24, and is up to 150, preferably up to 75, up to 60, up to 50 or up to 40. Strips having length to width ratios of 24 to 40 have been found to provide an excellent combination of high strength properties when formed into a molding compound and cured as described herein, while also exhibiting very good flow properties as described below. In absolute terms, the strips may have a width (longest dimension perpendicular to the length) of up to, for example, 4 mm. The width may be, for example at least 0.75 mm, at least 1 mm or at least 1.25 mm and may be up to 3 mm, up to 25 mm, up to 2 mm or up to 1.75 mm.

The ratio length to thickness (smallest dimension) of the strips is 50 to 1000. This ratio may be at least 70 or at least 100 and may be up to, for example 700, up to 400 or up to 250. The thickness of the strips may be at least 0.1 mm, at least 0.125 mm or at least 0.15 mm and may be up to 0.5 mm, up to 0.45 mm, up to 0.4 mm, or up to 0.35 mm.

The cross-sectional area of the strips may be, for example, at least 0.075 $mm^2$, at least 0.2 $mm^2$, at least 0.25 $mm^2$ or at least 0.3 $mm^2$ and, for example, up to 1.5 $mm^2$, up to 1.25 $mm^2$, up to 1.0 $mm^2$, up to 0.75 $mm^2$ or up to 0.5 $mm^2$.

The strips each may contain, for example, at least 500, at least 1000, at least 2000, at least 3000 and up to 20,000, up to 10,000, up to 7,500 or up to 5000 unidirectionally aligned filaments.

The strips are conveniently made by slitting the impregnated multifilament bed lengthwise (i.e., in the direction of the longitudinal extension of the filaments) to form ribbons of the desired width. The ribbons are then cut to length. Suitable methods for performing the cutting step are described, for example, in EP 1134314A. The thickness of the strips is preferably equal to the thickness of the impregnated multifilament bed, in which case no cutting is needed to bring the strips to the necessary thickness.

The strips are formed into the molding compound by first depositing them to form a mat. The strips are deposited flat, i.e., with their widths and lengths lying in the in-plane, i.e., within 10% of the plane of the mat (and the molding compound formed therefrom). They are also deposited in random directions, so the strips (and their respective filaments) are randomly oriented in two dimensions in the plane of the mat. The mat has an areal weight of 700 to 5000, preferably 700 to 3000 and more preferably 1000 to 3000 grams per square meter. The mat, being thicker than the individual strips, will consist of multiple layers of strips that intersect at random angles.

The deposition step is performed at a temperature below 40° C. A suitable temperature for applying the curable resin composition is at least 10° C., at least 15° C. or at least 18° C., up to 35° C. or up to 30° C.

The mat is then formed into the molding compound by heating it to an elevated temperature and compressing it to fuse the strips together. Generally, light pressures such as a gauge pressure of up to 500 kPa, up to 100 kPa or up to 10 kPa are adequate to perform this compression step. As with the impregnation step, the elevated temperature is at least 40° C. Suitable temperatures are as described with regard to the impregnation step.

The mat is compressed enough such that the strips adhere together to produce a molding compound has a bulk density of at least 0.02 $g/cm^3$. The bulk density may be at least 0.04 $g/cm^3$ or at least 0.1 $g/cm^3$, and may be up to, for example 0.5 $g/cm^3$. Nip rollers, heated platens and the like are generally suitable for performing this compression step. In general, the compressive force is not so great as to cause significant flow of the curable resin composition or movement/reorientation of the filaments.

After the compression set, the molding compound is cooled again to below 40° C. As before, the curable resin composition in the molding compound remains heat-softenable. Processing times and temperatures during the steps of forming the mat, heating and compressing it, and then cooling the mat are selected so that the curable resin composition does not cure to form a thermoset polymer. The glass transition temperature of the curable resin composition in the molding compound preferably is from 0 to 40° C., and may be, for example, 5 to 30° C., 10 to 30° C. or 15 to 25° C.

The resulting molding compound contains filaments and curable resin composition in the same proportions as described before with respect to the impregnated multifilament bed. Its areal weight is 700 to 3000 g/m$^2$ and its thickness may be, for example, 1 to 20 mm. The filaments from each constituent strip remain, except for small variations, aligned with each other. In the molding compound as a whole, however, the filaments are oriented in arbitrary directions within the plane of the molding compound, according to the orientations of the deposited strips. The filaments preferably are oriented randomly, by which it is meant that the filaments deposited with one constituent strip can assume any arbitrary orientation relative to those deposited with an adjacent strip.

Figure 2:
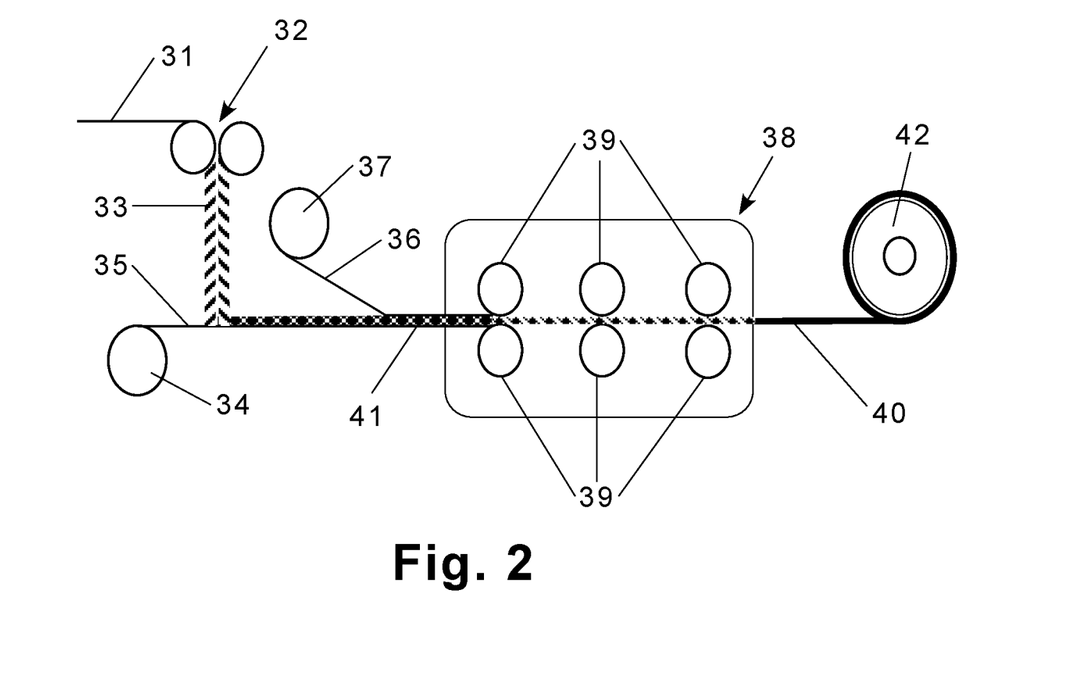
FIG. 2 is a schematic view of a second embodiment of the process of the invention.

FIG. 2 schematically illustrates an embodiment of a process for making the molding compound. A portion of the strip-cutting step is integrated into this embodiment. Ribbons of impregnated multifilament bed 31 are fed to chopper 32 where they are cut to length to from strips 33. Strips 33 are deposited onto release film 35 (which is supplied from roll 34) to form mat 41. Strips 33 are deposited so they lie flat and are oriented in arbitrary directions, preferably randomly in-plane. A second layer of release film 36 is deposited on top of mat 41 from roll 37.

Mat 41 with release films 35 and 36 are moved into compaction zone 38 where mat 41 is heated to heat-soften the curable resin composition and compressed to adhere strips 33 to form molding compound 40. Heating means as described above with respect to forming the impregnated multifilament bed are suitable. Release films 35 and 36 may be removed before the heat-softening and/or compaction step if desired.

As shown in FIG. 2, compression is performed by passing mat 41 though nip rollers 39, although other means of applying pressure to mat 41 such as are described above with regard to making the impregnated multifilament bed are suitable.

After compression, mat 41 is cooled (via cooling means not shown) to again re-solidify the curable resin composition and form molding compound 40. As shown in FIG. 2, molding compound 40 may be wound onto a roll such as roll 42, which in the embodiment shown is driven and pulls the various materials through the process. Alternatively, molding compound 40 may be cut into convenient lengths for packing, storage, transportation or immediate use, as needed.

The separate portions of the process illustrated in FIGS. 1 and 2 can be combined into a single operation in which impregnated multifilament bed 11 is fed directly into the various cutting steps to form strips 33, which are then directly taken to form mat 41 and molding compound 40. For example, impregnated multifilament bed 11 from FIG. 1 can be passed continuously through a slitter to form ribbons that are fed continuously to chopper 32 and from there to the remaining steps of the process.

Alternatively, impregnated multifilament bed 11 can be slit to form ribbons that are rolled for later use. It is also possible to store strips 33 for later use in making mat 41 and molding compound 40.

The curable resin composition contains at least one epoxy resin. The epoxy resin or mixture (if two or more are present) is generally the predominant component of the curable resin composition. In order to produce a curable resin composition that is a non-tacky solid at 23° C., the epoxy resin or mixture by itself preferably is a non-tacky solid at that temperature. In addition, the epoxy resin or mixture by itself preferably heat-softens when brought to a temperature of 40° C. to 80° C., preferably 40° C. to 65° C.

Therefore, the epoxy resin includes at least one epoxy resin that is solid at 23° C. It may contain a mixture of one or more epoxy resins that by themselves are solid at 23° C. and one or more epoxy resins that by themselves are liquid at 23° C.

The epoxy resin or mixture may have an epoxy equivalent weight of at least 210 or at least 220, up to, for example 1000, up to 500, up to 350 or up to 300 g/equivalent.

The epoxy resin or mixture may have a number average epoxy functionality of at least 2.4, at least 2.5 or at least 2.6 epoxy groups per molecule. The number average epoxy functionality may be up to 6, up to 4, up to 3.5 or up to 3.0.

The epoxy resin preferably contains at least one polyglycidyl ether of a polyphenol. These include:

a. Diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol.

b. Polyglycidyl ethers of phenol-formaldehyde novolac resins (epoxy novolac resins), alkyl substituted phenol-formaldehyde resins such as epoxy cresol novolac resins, phenol-hydroxybenzaldehyde resins and cresol-hydroxybenzaldehyde resins, in each case having three or more epoxy groups per molecule.

c. Oxazolidone group-containing polyglycidyl ethers of phenolic compounds such as are described for example in U.S. Pat. No. 5,112,932. Such epoxy resins include reaction products of a diisocyanate such as diphenylmethane diisocyanate or toluene diisocyanate with a diglycidyl ether of a diphenol such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol. These may have epoxy functionalities of about 1.9 to about 2.5, especially 1.9 to 2.2 and epoxy equivalent weights of, for example, 300 to 500, especially 325 to 450.

d. Partially advanced epoxy resins of any of types a, b or c above.

Epoxy resins of types a, b, c and d are commercially available. Commercial products are often a blend of two or more or types a, b, c and d.

Commercially available polyglycidyl ethers of bisphenol A and bisphenol F that are useful in this invention include those sold by Olin Corporation under the designations D.E.R.® 330, D.E.R.® 331, D.E.R.® 332, D.E.R.® 354, D.E.R.® 383, D.E.R. 661 and D.E.R.® 662 resins. Commercially available resins such as these generally include, in addition to diglycidyl ethers of a bisphenol (type a resin), some quantities of types b and/or c epoxy resins, and accordingly have epoxy functionalities somewhat greater than 2.

Commercially available epoxy novolac resins that are useful in this invention include D.E.N.® 354, D.E.N.® 431, D.E.N.® 438 and D.E.N.® 439 from Olin Corporation. Commercially available resins such as these are generally a mixture of type a and type b epoxy resins, and may also include some advanced materials (type d). These products may have epoxy equivalent weights of, for example, 150 to 200 and have, for example, epoxy functionalities of 2.2 to 5.0, especially 2.6 to 4.0.

Commercially available epoxy cresol novolac resins that are useful in this invention include Huntsman Araldite ECN 1273, Epon® resins 164 and 165 from Hexion, and Epiclon N-660, N-664, N-670, N-673, N-680, N-690, N-695 from DIC Americas. Commercially available resins such as these are generally a mixture of type a and type b epoxy resins, and may also include some advanced materials (type d). These products may have epoxy equivalent weights of, for example, 180 to 250 and have, for example, epoxy functionalities of 2.2 to 5.0, especially 2.6 to 4.8.

A suitable commercially available epoxy resin that contains oxazolidone groups is D.E.R. 6508 (Olin Corporation). This product may contain some quantity of type a and/or type d epoxy resins.

The curable resin composition preferably contains at least one type a epoxy resin and at least one type b or c epoxy resin, optionally with a type d epoxy resin. It may contain a type a epoxy resin, a type b epoxy resin and a type c epoxy resin, optionally together with a type d epoxy resin. In such preferred compositions, the type a, b, c and d epoxy resins together may constitute at least 50%, at least 75%, at least 90% or at least 95% of the total weight of all epoxy resins present in the curable resin composition. They may constitute 100% of the total weight of all epoxy resins.

A particularly preferred curable resin composition includes at least one diglycidyl ether of a bisphenol product, at least one epoxy novalac resin product and at least one oxazolidone-containing epoxy resin product, these products constituting 90 to 100% or 95 to 100% of the total weight of all epoxy resins present in the curable resin composition.

Other epoxy resins may be present, but preferably are present in minor quantities if present at all. Among these other epoxy resins are cycloaliphatic epoxides including those described in U.S. Pat. No. 3,686,359. These include (3,4-epoxycyclohexyl-methyl)-3,4-epoxy-cyclohexane carboxylate, bis-(3,4-epoxycyclohexyl) adipate, vinylcyclohexene monoxide and mixtures thereof.

In some embodiments, the epoxy resins are not rubber-modified and do not contain polyether groups. However, rubber modification and modification with epoxy-terminated polyethers and/or tougheners containing a polyether that has capped terminal isocyanate groups is within the scope of the invention.

The curable resin composition includes at least one curing agent for the epoxy resin. The curing agent preferably is a latent type having an activation temperature of at least 100° C. and preferably at least 120° C. The curing agent may be latent, for example, due to having blocked reactive groups, encapsulation, by virtue of having an elevated melting temperature, and/or by virtue of having limited solubility in the epoxy resin (or mixture) until exposed to an elevated temperature.

The activation temperature of a curing agent can be evaluated by combining the curing agent and a diglycidyl ether of bisphenol A having an epoxy equivalent weight of 182-192 at a stoichiometric ratio, applying the combination between two substrates, heating at various temperatures for two hours, and then in each case measuring the lap shear strength according to DIN ISO 1465. Another sample is cured 30 minutes at 180° C., which conditions represent "full cure" conditions. The "activation temperature" refers to the lowest curing temperature at which the combination achieves at least 30% of the lap shear strength obtained under the "full cure" conditions.

Suitable curing agents include, for example, guanamines such as dicyandiamide, methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine and benzoguanamine. Other suitable curing agents include dihydrazides such as adipic dihydrazide, stearic dihydrazide, terephthalic dihydrazide or isophthalic dihydrazide. A mixture of a guanamine and a dihydrazide may be used. A preferred curing agent is dicyandiamide.

The curing agent is present in an amount sufficient provide at least 0.75 epoxy-reactive groups per epoxide group provided by the epoxy resin (or mixture). A preferred amount is at least 0.85, at least 0.90 or at least 0.95 epoxy-reactive groups per epoxide group, up to 1.5, up to 1.25, up to 1.15, up to 1.10, up to 1.05 or up to 1.02 epoxy-reactive groups per epoxy group.

The catalyst for the reaction of the epoxy resin with curing agent also preferably is encapsulated or otherwise a latent type that becomes active only upon exposure to elevated temperatures. Among the useful epoxy catalysts are ureas such as toluene bis-dimethylurea, p-chlorophenyl-N,N-dimethylurea, 3-phenyl-1,1-dimethylurea, 3,4-dichlorophenyl-N,N-dimethylurea, N-(3-chloro-4-methylphenyl)-N',N'-dimethylurea, and various aliphatic urea compounds such as are described in EP 1 916 272. Other suitable latent catalysts include tert-acryl- or alkylene amines like benzyldimethylamine, 2,4,6-tris(dimethylaminomethyl)phenol, piperidine or derivatives thereof, $C_1$-$C_{12}$ alkylene imidazole or N-arylimidazoles, such as 2-ethyl-2-methylimidazol, or N-butylimidazol and 6-caprolactam. 2,4,6-tris(dimethylaminomethyl)phenol integrated into a poly(p-vinylphenol) matrix (as described in European patent EP 0 197 892), or 2,4,6-tris(dimethylaminomethyl)phenol integrated into a novolac resin, including those described in U.S. Pat. No. 4,701,378, are also suitable. The urea catalysts described above are generally preferred. Toluene bis-dimethylurea is especially preferred.

The catalyst is present in a catalytically effective amount. A suitable amount may be, for example, 0.1 to 10, 0.25 to 5, 1 to 5 or 1 to 3 parts by weight catalyst per 100 parts by weight of the epoxy resin(s).

The curable resin composition also includes at least one internal mold release agent. An internal mold release agent is a substance contained within the curable resin composition that reduces adhesion of the cured composition to a mold or other surface against which it has cured. Examples of internal mold release agents include fatty acids having 16 or more carbon atoms, especially 18 to 36 carbon atoms; as well as alkali metal or ammonium salts, monoalkyl esters, monoalkylamides and di- and/or tri-glycerides of such fatty fatty acids. A useful type of internal mold release includes a mixture of a fatty acid having 18 to 36 carbon atoms and a di- and/or tri-glyceride of a fatty acid having 10 to 36 carbon atoms.

The internal mold release agent is present in an amount effective to reduce the adhesion of the cured composition to the mold or other surface. A suitable amount is, for example, at least 0.5 parts, at least 1 part, or at least 1.5 parts up to 10 parts, up to 7 parts, up to 5 parts or up to 4 parts by weight per 100 parts by weight of the epoxy resin(s).

The curable resin composition may contain various other ingredients, such as, for example, one or more diluents, tougheners, rubbers plasticizers, extenders, colorants, fire-retarding agents, smoke suppressants, thixotropic agents, adhesion promoters, biocides and antioxidants. The curable resin composition may contain finely divided solids such as calcium carbonate, fumed silica and/or carbon nanotubes that fill interstitial spaces between the filaments at or near the surface of the molding compound and cured composite to provide a smoother surface.

The curable resin composition is a room temperature solid that is not tacky at 23° C. Its physical form in some embodiments is that of a continuous phase of epoxy resin or resins in which the remaining ingredients are dissolved, encapsulated and/or dispersed. It heat-softens as described before, and has a curing temperature of at least 100° C., preferably at least 120° C. or at least 140° C.

The molding compound of the invention is useful for making reinforced composites. Molding is conveniently performed by introducing the molding compound into a mold or against a form and subjecting it to superatmospheric pressure at a temperature sufficient to cure the curable resin composition to form a thermoset polymer. The temperature is at least the curing temperature of the curable resin composition. The temperature is at least 100° C. and is preferably at least 120° C. or at least 140° C., and may be, for example, up to 260° C., up to 225° C., up to 200° C. or up to 180° C.

Curing is performed for a time sufficient to produce a thermoset polymer. It is preferably performed for a time sufficient to produce a thermoset polymer having a glass transition temperature of at least 120° C., at 140° C., at least 150° C. or at least 160° C. The curing time preferably is up to 20 minutes. It may be, for example, at least 1 minute, at least 1.5 minutes, at least 2 minutes, at least 2.5 minutes and up to 15 minutes, up to 10 minutes, up to 8 minutes, up to 6 minutes, up to 5 minutes, up to 4 minutes or up to 3 minutes.

During the curing process, the increasing temperature and applied pressure cause the molding compound to flow within and assume the shape of the mold cavity or form. The curable resin composition first heat-softens, which allows it to flow. Filaments are carried along with the flowing resin.

As the molding compound is produced in the form of sheets, it is often convenient to form a stack of two or more sheets of the molding compound in the mold or against the form. The dimensions of the sheets and the number of sheets are selected such that their cumulative volume (and weight) is equal to that of the molded composite.

An important advantage of this invention is that the molded composite exhibits highly isotropic properties and high tensile properties even when the molding compound is molded under somewhat high flow conditions. Flow conditions can be expressed as "% coverage", i.e., 100% times the ratio between the largest cross-sectional area of the molding compound charged to the molding step and the largest cross-sectional area of the molded composite (or, equivalently that of the mold or form). Lower % coverages correspond to higher flow. In some embodiments the % coverage may be as low as 30%, as low as 40%, as low as 50% and, for example, up to 80%, up to 75% or up to 70%. In other embodiments, the % coverage may be up to 100%.

In embodiments in which the % coverage is 80% or below, the strips used to make the molding compound preferably have a length to width ratio of 24 to 40, as these ratios provide an excellent combination of strength and ability to flow when molded. Thus, very high tensile strengths and moduli can be obtained in such cases, even when the % coverage is, for example 50 to 80% or 60 to 80%.

Unlike the molding compound described in EP 1134314A, the molding compound of this invention has been found to exhibit at most a small loss of properties when molded and cured under low flow conditions where the % coverage is up to 75% or up to 70%, and is as low as 40%. This represents a significant advantage in preparing the molding compound for part manufacturing. Instead of fabricating the molding compound into pre-formed shapes and sizes that closely match the shape and size of the mold, the molding compound of this invention needs to be formed into dimensions that only roughly correspond to those of the mold. This greatly reduces pre-molding fabrication requirements and their associated costs, particularly when manufacturing parts that have complex geometries.

In an alternate embodiment, the strips, instead of being formed into a molding compound, can be used directly to manufacture a molded composite. In such an alternative process, the strips are introduced into a mold or against a form such that they are oriented randomly in two dimensions. The strips are then cured under pressure as described above to produce a molded composite.

The molded composite includes a cured resin phase having filaments dispersed therein. The filaments constitute 40 to 70% of the combined weight of the filaments and cured resin phase. Macroscopically, the filaments are oriented arbitrarily in two dimensions. However, the filaments corresponding to each individual strip used to make the molding compound tend to maintain their alignment, particularly when molded under low flow (high % coverage) conditions. Some disalignment may be seen when molding is performed under higher flow (such as 50 to 80% coverage) conditions, but highly isotropic properties are still commonly obtained. Some bending and disalignment of the filaments may occur near edges and corners in all cases.

The cured composite exhibits isotropic properties. This can be evaluated, for example, by cutting test specimens with their longest lengths oriented at 90° to each other, and measuring tensile modulus. The tensile moduli for the specimens taken in the two orientations are typically within 10% and often within 5% of each other. In absolute terms, the tensile modulus of the cured composite (measured according to ASTM D3039) may be, for example, 25 to 50 GPa and the tensile strength may be, for example 100 to 500 MPa. In particular embodiments, the tensile modulus is at least 35 GPa or at least 40 GPa and the tensile strength is at least 225 MPa or at least 300 MPa.

The process and composite of the invention is useful, for example, to make vehicle structural and non-structural parts, body panels, deck lids, for automobiles, trucks, train cars, golf carts, all-terrain vehicles, boat hulls and decks, jet-ski hulls and decks, go-carts, farm equipment, lawn mowers and the like. It is useful to make aircraft skins. Other uses include luggage and panels for consumer and industrial appliances, and sporting goods such as hockey sticks, skis, snowboards and tennis rackets. Because of the high strength and isotropic properties, the composites are useful for making load-bearing structural elements for automotive and other vehicular frames, aircraft structural beams and supports, construction frames and the like.

The following examples are provided to illustrate the invention but are not intended to limit the scope thereof. All parts and percentages are by weight unless otherwise indicated. All molecular weights are number averages unless otherwise indicated.

EXAMPLES

A curable resin composition is made according to the following procedure:

44.7 parts of an oxazolidone-modified diglycidyl ether of bisphenol A (D.E.R. 6508 from Olin Corporation, epoxy equivalent weight about 400, epoxy functionality about 2.0) and 47.02 parts of an epoxy novolac resin (D.E.N. 438 from Olin Corporation, epoxy equivalent weight about 178, average epoxy functionality about 3.6), 3.56 parts of liquid diglycidyl ether of bisphenol A product (D.E.R. 331 from Olin Corporation, epoxy equivalent weight about 187, epoxy functionality about 2.2) and 4.68 parts of an internal mold release agent that includes montanic acid esters (Licolub® WE 4 from Clariant) are mixed at a temperature of about 100 to 130° C. until homogeneous.

Separately, 21.6 parts of a room temperature liquid diglycidyl ether of bisphenol A product (D.E.R. 331 from Olin Corporation, epoxy equivalent weight about 187, epoxy functionality about 2.2), 9.17 parts of a finely particulate dicyandiamide product (Dyhard® from Air Products and Chemicals, d50=2.5 μm), 4 parts of toluene bis-dimethyl urea (Omicure® U-410 M from Diamond Performance Materials) and 3.51 parts of a linear carboxylic acid (Unicid acid 350 from Baker Hughes) are mixed together. The separate mixtures are then combined and mixed under high shear at 75 to 85° C. for about 5 minutes.

The resulting curable resin composition includes a mixture of epoxy resins that have an average epoxy equivalent weight of about 228 and an average epoxy functionality of about 2.74. The epoxy resin mixture cools to form a solid that is non-tacky at room temperature. The dicyandiamide is dispersed in the epoxy resin mixture mainly in the form of small particles. The curable resin composition has a glass transition temperature of less than 20° C.

The curable resin composition is formed into films by heating the composition to 80° C. to heat-soften it. The heat-softened material is then extruded onto release paper and gauged to form films having a thickness of 0.008 inches (0.2 mm) and an areal weight of approximately 115 g/m². The films are cooled to room temperature to re-solidify the resin. No significant curing is seen during this film-forming step.

A bed is made from DowAksa A-42 24 K carbon fiber tows. The tows are arranged in parallel and spread to form a horizontal bed having a width of 100 to 200 cm and a thickness of 0.25 mm. The tows are pulled through an impregnation station similar to that shown in FIG. 1, where solid films of the curable resin composition as described above are brought into contact with the top and bottom surfaces of the bed. The resulting sandwich structure is then brought to a temperature of 110° C. to heat-soften the curable resin composition and passed through a series of nip rollers to compress it and force the softened curable resin composition into the bed and between individual filaments. The assembly is then cooled to resolidify the curable resin composition and produce an impregnated multifilament bed. The impregnated multifilament bed exhibits a peak normal force of less than 2 grams on the tack-and-friction test described before.

To make Examples 1-4, the impregnated multifilament bed contains about 60% by weight of unidirectionally aligned filaments and about 40% by weight of the curable resin composition. To make Examples 5-8, the impregnated multifilament bed contains about 50% by weight of unidirectionally aligned filaments and about 50% by weight of the curable resin composition. In each case the bed has an areal density of about 330 g/m². The curable coating composition in the impregnated multifilament bed has a glass transition temperature of less than 40° C.

The impregnated multifilament bed is slit lengthwise to form ribbons having a width of 1.6 mm and a thickness of 0.25 mm. The ribbons are then cut into multiple strips having lengths of 25.4 mm, 50.8 mm and 76.2 mm, which correspond to length:width ratios of about 16:1, 32:1 and 48:1, respectively.

The strips of each length and filament content are formed into molding compounds using the general process shown in FIG. 2. The strips are deposited flat onto a release paper at room temperature, such that they are oriented randomly within the plane of the resulting mat. The mat is then covered with a second sheet of release paper and passed through a heating compaction station where it is heated to a temperature of about 50° C. to heat-soften the curable resin composition and compacted between a series of nip rollers. The compacted mat is then cooled to room temperature to again re-solidify the curable resin composition and form a molding compound of the invention. The molding composition in each case has an areal density of about 1800 g/m². The curable coating composition in the molding compound has a glass transition temperature of less than 40° C. and exhibits a peak normal force of less than 2 grams on the tack-and-friction test described before.

Molded composites are prepared from each of the molding compounds. In each case, the molding compounds are cut into squares and stacked to create a charge weighing 350 grams. The stacked charge is placed in a 304.8×304.8×2.5 mm steel mold that is preheated to 150° C. The dimensions of the squares of molding compound are 304.8 mm×304.8 mm (100% coverage), 215 mm×215 mm (50% coverage) or 255 mm×255 mm (70%) coverage. The mold is closed and the molding compound is cured and molded under a pressure of about 8 MPa for 3 minutes, under which conditions the molding compound flows to entirely fill the mold. The mold is then opened and the composite is removed and cooled to room temperature. The resin phase of the composite has a glass transition temperature of greater than 140° C. by dynamic mechanical analysis.

25 mm×250 mm ASTM tensile test specimens are cut from the molded plaques, all strips being cut with their lengths in the same direction. Tensile strength, and tensile modulus (chord modulus at 0.1% to 0.3% extension) are measured according to ASTM D3039 at room temperature and 50% relative humidity. Tensile tests are run at a crosshead speed of 1.3 mm/minute until the specimen fails. At least 5 test specimens are evaluated for each molding, with the average of the values being as reported in the following table.

| Example | % Coverage | % Filament Content | Strip length:width ratio | Tensile Str. at break, MPa | Tensile Mod., GPa |
|---|---|---|---|---|---|
| 1 | 70 | 60 | 32 | 260 | 43 |
| 2 | 100 | 60 | 32 | 275 | 40 |
| 3 | 70 | 60 | 16 | 225 | 36 |
| 4 | 100 | 60 | 48 | 325 | 40 |
| 5 | 70 | 50 | 32 | 200 | 34 |
| 6 | 100 | 50 | 32 | 175 | 34 |
| 7 | 70 | 50 | 16 | 130 | 28 |
| 8 | 100 | 50 | 48 | 250 | 34 |

Example 1 has a tensile strength very close to that of Example 2, even though the % coverage in Example 1 is only 70% compared to 100% in Example 2. Tensile modulus is somewhat higher for Example 1 than Example 2. This data shows that the molding compound of the invention can be used without loss of properties in low mold coverage situations.

Similar results are seen in comparing Example 5 with Example 6. The low coverage case (Example 5) actually exhibits a higher tensile strength.

Examples 3 and 7 show the effect of reducing the length:width ratio of the strips. Tensile strength and modulus are reduced.

Examples 4 and 8 show the effect of increasing the length:width ratio of the strips. A positive effect is seen in tensile strength in the 60% filament case. However, the molding compound does not flow well and a loss of properties is seen when these molding compounds are used at 70% coverage.

Additional strips are cut with their lengths oriented 90° from those indicated above. The tensile modulus of the strips is in all cases within 5% of the values indicated above, which shows that the molded composites are highly isotropic in their physical properties.

What is claimed is:

1. A method for manufacturing a molding compound, comprising the steps of:
   A) forming a bed of unidirectionally aligned multifilament tows, the bed having a weight of 80 to 400 grams per square meter;
   B) impregnating the bed with the curable resin composition by applying the curable resin composition to at least one major surface of the bed, heating the curable resin composition to a temperature of at least 40° C. and applying pressure to the bed and the heated curable resin composition to form an impregnated multifilament bed having a filament content of 20 to 80% by weight and cooling the impregnated multifilament bed to below 40° C., wherein the curable resin composition:
   i) contains at least one epoxy resin, at least one curing agent for the epoxy resin, at least one catalyst for the reaction of the epoxy resin with the curing agent, and an internal mold release agent;
   ii) has a glass transition temperature of 0 to 40° C. as measured by differential scanning calorimetry;
   iii) is heat-softenable;
   iv) has a curing temperature of at least 100° C. and
   v) cures to form a thermoset polymer;
   C) cutting the impregnated multifilament bed into strips of unidirectionally aligned filaments embedded in a curable resin composition, said strips having (i) a longest dimension parallel to a direction of alignment of the filaments, said longest dimension being 25 to 100 mm, (ii) a length to width ratio of 16 to 150 and (iii) a length to thickness ratio of 50 to 1000;
   D) depositing said strips to form a mat having an areal weight of 700 to 5000 grams per square meter, wherein said strips are randomly oriented within the plane of the mat; and
   E) heating the mat to an elevated temperature of at least 40° C. and compressing the mat to fuse said strips together to form a molding compound having 20 to 80% by weight of filaments that are randomly oriented in-plane and correspondingly 80 to 20% by weight of the curable resin composition, and cooling the molding compound to below 40° C., wherein the curable resin composition remains heat-softenable after step E) is performed.

2. The method of claim 1, wherein the impregnated multifilament bed made in step B) has a filament content of 50 to 70% by weight and the molding compound formed in step G) contains 50 to 70% by weight filaments and correspondingly 50 to 30% by weight of the curable resin composition.

3. The method of claim 1, wherein the strips have a length to width ratio of 24 to 40 and a width of 0.75 to 3 mm.

4. The method of claim 1 wherein the areal weight of the mat formed in step D) is 1000 to 3000 g/m².

5. The method of claim 1 wherein the strips each contain 3000 to 10,000 unidirectionally aligned filaments.

6. The method of claim 1 wherein the curable molding composition contains at least one diglycidyl ether of a polyhydric phenol, at least one polyglycidyl ether of a phenol-formaldehyde novolac resin and at least one oxazolidone group-containing polyglycidyl ether of a phenolic compound.

7. The method of claim 6 wherein the at least one catalyst for the reaction of the epoxy resin with curing agent includes a urea compound selected from one or more of toluene bis-dimethylurea, p-chlorophenyl-N,N-dimethylurea, 3-phenyl-1,1-dimethylurea, 3,4-dichlorophenyl-N,N-dimethylurea, N-(3-chloro-4-methylphenyl)-N',N'-dimethylurea.

8. The method of claim 7 wherein the curing agent includes dicyandiamide.

* * * * *